B. EASTWOOD.
Cam Mechanism for Changing the Throw of a Lever and Connecting Rod.
No. 213,553.  Patented Mar. 25, 1879.
Fig 1.
Fig 2.
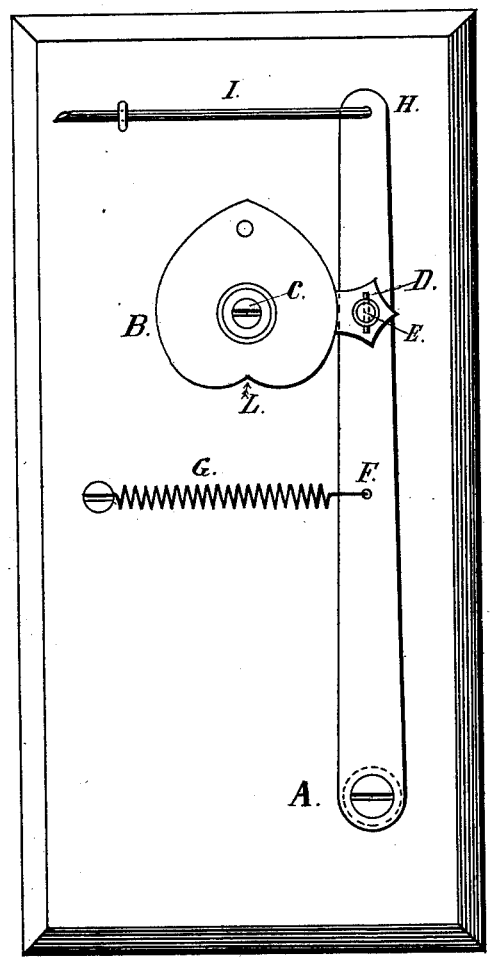
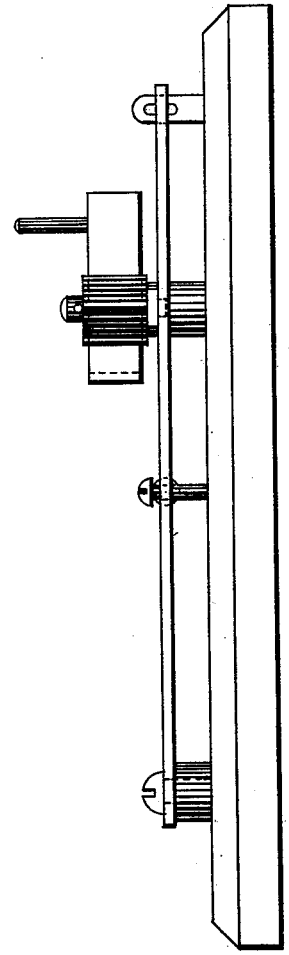
Witnesses
Theo. Scheffler
John Avison
Inventor
Benj'm Eastwood

UNITED STATES PATENT OFFICE.

BENJAMIN EASTWOOD, OF PATERSON, NEW JERSEY.

IMPROVEMENT IN CAM MECHANISMS FOR CHANGING THE THROW OF A LEVER AND CONNECTING-ROD.

Specification forming part of Letters Patent No. 213,553, dated March 25, 1879; application filed December 16, 1878.

*To all whom it may concern:*

Be it known that I, BENJAMIN EASTWOOD, of the city of Paterson, in the county of Passaic and State of New Jersey, have invented a new and useful Improvement of a Cam Mechanism for Changing the Throw of a Lever and Connecting-Rod which are operated by a cam in such a manner that with a required number of revolutions of the cam the same number of changes are taking place.

Such arrangements are, for instance, required in silk machinery, where I have it already successfully applied; but more parts have been employed formerly; and the object of my invention is to reduce the number of those parts; also the wear and necessary expenses of keeping the same in repair.

In the accompanying drawings, in which similar letters of reference indicate like parts, Figure 1 is a side view; Fig. 2, an end view.

To a lever, A H, (A representing the fulcrum,) is attached a polygonal prism, D, or a cylinder, by means of a stud or pin, E. If it is a prism, the sides are made concave to fit the shape of the cam, if the latter is round; if the cam is flat, the sides can be flat. The prism or cylinder has a corresponding hole for the pin, around which it is allowed to turn freely. Said hole is placed out of the center of the polygon or cylinder, the eccentricity of which depends on the desired amount of change of the position of the lever. B is the motion-producing cam, fastened to a shaft, C. At F on the lever is either a spring, G, or a weight attached, for the purpose of keeping the lever with the prism against the face of the cam. At H, the end of the lever, is a rod, I, attached, to communicate the motion to the required parts. The cam B is in contact with the prism D, and thus gives motion to the lever when the cam is set in motion.

It will be perceived that whenever the point L of the cam comes toward the prism during the motion the prism will change its position—that is, it will turn around the pin E— and another side of the prism will come in contact with the cam, and so with every revolution of the latter another side of the prism will be operated upon. If the farthest side of the prism from the pin E is in contact, then the lever will be farther from the cam than when the nearest side to the pin is in contact with the cam, always allowing the cam to be in the same position; also, there will be different intermediate positions of the lever, according to the sides of the prism operated upon. A six-sided prism will produce six changes at the point H, or the parts to which the motion is communicated during six revolutions of the cam.

What I claim is—

The combination of a cam and lever with a polygonal prism or cylinder, and the attachments at H and F, the prism or cylinder being connected with the lever by means of a pin passing through a hole placed eccentrically in the prism or cylinder, substantially as and for the purpose described.

BENJN. EASTWOOD.

Witnesses:
   THEO. SCHEFFLER,
   JOHN AVISON.